Sept. 5, 1933.  A. B. BIRTLES  1,925,090
LINE SAWING MACHINE
Filed Oct. 19, 1931
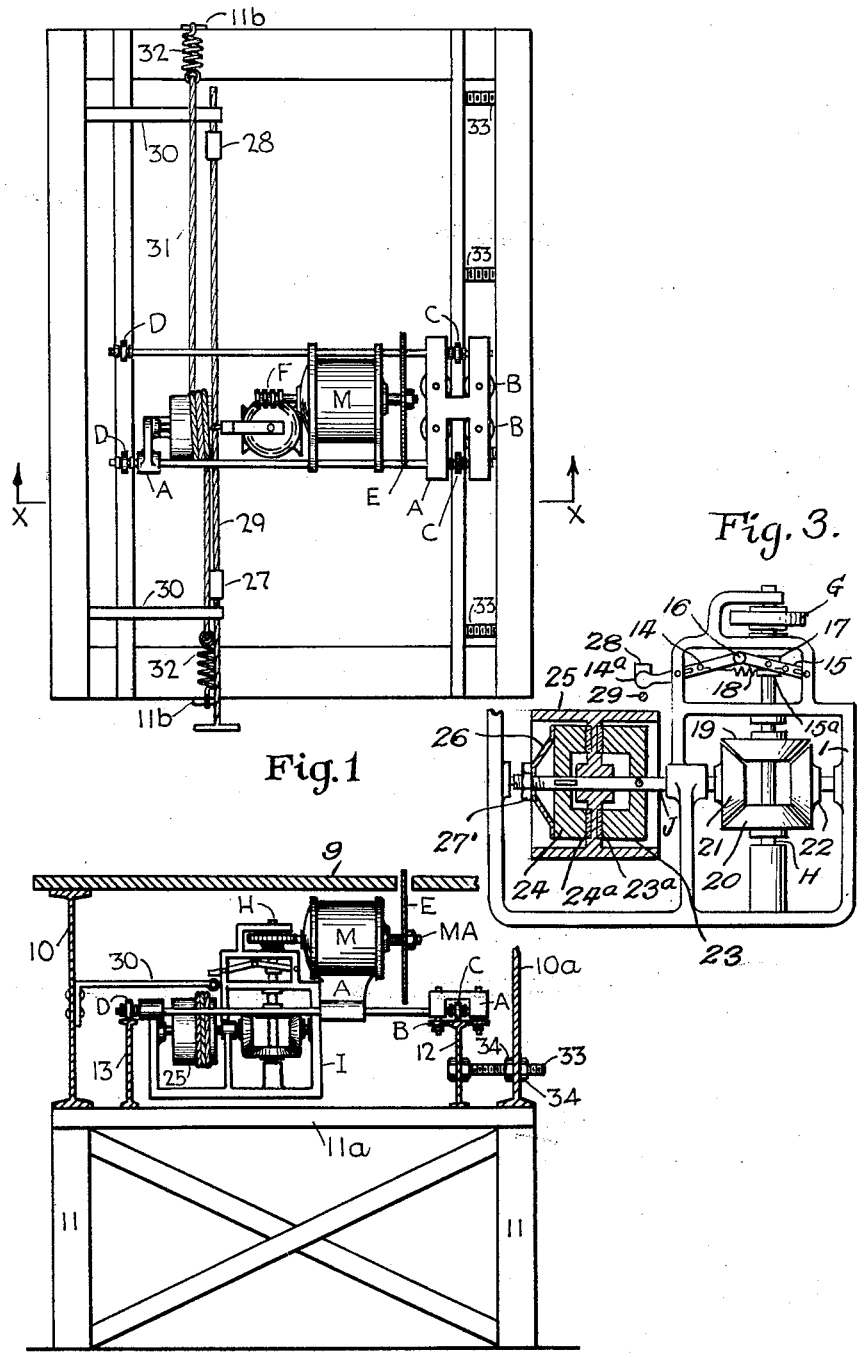
INVENTOR.
ARTHUR B. BIRTLES.
BY John L. Milton
ATTORNEY.

Patented Sept. 5, 1933

1,925,090

UNITED STATES PATENT OFFICE 1,925,090

LINE SAWING MACHINE

Arthur B. Birtles, Louisville, Ky.

Application October 19, 1931. Serial No. 569,737

6 Claims. (Cl. 143—47)

This invention relates to machines employed to cut or edge lumber such as flooring or the like to a desired and predetermined line or surface as exemplified in rip saw operations.

The object of this invention is to produce a simple, accurate, economical and efficient automatic machine of the kind in question, to which end the invention consists in the combination and arrangement of parts hereinafter described and claimed, the main characteristic of the same being that the motor which drives the cutter is mounted on a carriage, the latter also propels a carriage traversing rails carried on a frame. One of these rails is linearly adjustable so as to force the carriage to travel a predetermined set path. An advantage of the cutter traveling in terms of the stationary objects, as compared with the usual reverse order resides in the fact that only substantially half of the usual floor space is required for the complete machine.

In the accompanying drawing to which reference is made for a better understanding of the invention—Figure 1 is a foreshortened plan view of the machine with the work table omitted. Fig. 2 is an end view of Fig. 1 along the lines X, X. Fig. 3 is an enlarged elevation of a part of the carriage mechanism.

9 represents a work table top which is carried on major eye beams 10, 10a which are disposed on vertical supports 11, 11 tied together with horizontal bars 11a which also carries minor beams 12, 13 on which is mounted a traveling saw carriage A which is equipped with rollers B, B, C, C, D, D. The vertical ones C, C, D, D, are arranged to carry the gravity load and B, B arranged to guide the carriage according to the line determined by the linear disposition of rail 12.

The saw carriage is provided with a motor M on the extended shaft MA on which is the saw or cutter E, which, when in the design selected for explaining this invention and shown in Figs. 1 and 2, is to project above the work top 9 in the conventional way. Motor shaft MA carries a worm F and gear G, for operating vertical shaft H, supported by housing or frame I, shown in skeleton form for the purpose of clearness. This frame is constructed so as to form a part of the carriage A as an integral or assembled unit.

Shaft H is carried in suitable bearings which are secured to frame I and is arranged to be axially movable under the influence of a toggle mechanism which is composed of arms 14 and 15 pivoted to the frame I, and articulated to each other at 16. In arm 15, which is made in yoke or double form, is pivot 15a which engages with a conventional yoke or collar (not shown) which is carried in a correlated groove of collar 17 fixed on shaft H. To hold this toggle mechanism with its control parts in a given position, i. e. up or down, spring 18 is provided (Fig. 3) and so mounted as to be in the clear of the path of travel by arms 14, 15.

Worm gear G is splined to shaft H so as to allow free movement of the latter. To shaft H are keyed friction cones 19, 20 so located that when the toggle is in the up position as shown in Fig. 3 engagement of 20 will be made between cones 21 and 22, the latter functioning as an idler while the frame is keyed to shaft J rotatably mounted in frame I. To shaft J cup 23 is keyed, and cup 24 is splined for free movement on same, these cups carrying friction surfaces 23a, 24a for engagement with the web of drum 25 which is freely mounted on shaft J so that power from shaft J to this drum must be transmitted through these friction surfaces. Cupped spring 26 bears against cup 24 through pressure controlled by nut 27' which is therefore adjustable for any desirable position. The friction members in the relations described and illustrated are for the purposes set forth hereinafter.

14a is an extension of arm 14 for manipulating the toggle by means of inclined planes 27, 28 which are carried on rod 29 which is slidably mounted in arms 30, 30 which in turn are carried on beam 10. These inclined planes or cams are for the purpose of changing the position of the toggle and the relation between either cam and the lever extension may be set so as to either reverse the toggle completely or simply remove the tension to a degree that will separate the cones.

Electric current is to be carried to the motor in the conventional way, either through the rails and insulated members or through a flexible wire. As the motor is energized the saw blade E will be put into operation and the worm gearing on the other end of the motor will transmit power to shaft H which in turn will transmit power to shaft J and drum 25 according to whether the toggle is in the up or down position. When the cones are in a neutral position shaft J is stationary.

On drum 25 are disposed wraps or turns of rope 31, the ends of which are attached through springs 32, 32 to extensions 11b, 11b from frame members 11a, 11a. The drum and rope are provided for the purpose of enabling the carriage to propel itself from one end of the table to the other, or for it to traverse only a selected portion of same which can be controlled by the location of adjustable cams 27 and 28 which are to start and arrest the movement of the carriage by the manipulation of the toggle mechanism referred to above.

Springs 32 are not only provided for taking up irregularities or unevenness of power or adjusting for alignment, but are to yield in the event that the carriage meets with an obstruction as may be the case in the event of the cutter E encountering a knot or other hard member in performing its work. As a further protection the friction surfaces carried on the inside of drum 25, the structure of which has been described, are to be so adjusted by nut 27' that a desired slippage even of a continuing nature can be effected. The object of this is to not only protect the mechanical apparatus but to relieve the operator from having to carefully scrutinize the product being operated on and to relieve him of the obligation of watching the saw during its course of travel and further freeing him for faster work.

A series of bolts 33 are rigidly secured into the beam 12 and adjustably secured to beam 10a. These bolts are incorporated for the purpose of adjusting or warping the beam 12 to any desired line. Nuts 34 are provided for the purpose of securing said adjustment. It will be noted that beam 12 can be forced and set to a straight, convex, concave or even compound line and it will of course follow that the motor carriage with the revolving motor and cutter will faithfully follow same and repeat indefinitely until changed, which is a feature of this invention. A milling cutter can be substituted for the circular saw illustrated for the purpose of removing material to a predetermined line or surface.

To those skilled in the art there are many applications, modifications and variations without departing from the spirit of this invention, therefore, I wish to be limited only by the appended claims.

I claim:

1. An apparatus for cutting flooring or the like to a desired line, comprising, a saw mounted on a carriage, means providing a deflectively adjustable rail on which the carriage is arranged to travel and reciprocate and guide said saw through a predetermined course; in combination with a motor mounted on said carriage and arranged to actuate said saw and propel said carriage through yieldable means carried on said carriage.

2. An apparatus for cutting flooring or the like to a desired line, comprising, a saw mounted on a carriage, means providing a deflectively adjustable rail carried on a frame and on which the carriage is arranged to travel and reciprocate and guide said saw through a predetermined course; in combination with a motor mounted on said carriage and arranged to actuate said saw and propel said carriage through yieldable means carried on said carriage and auxiliary yielding means attached to said frame.

3. An apparatus for cutting flooring or the like to a desired line, comprising, a saw mounted on a carriage arranged to reciprocate on a pair of rails carried on a frame and arranged to be guided by one of said rails means for deflectively adjusting said rail in order to direct said saw through a predetermined course; in combination with a motor mounted on said carriage and organized to actuate said saw and propel said carriage through yieldable means carried on said carriage.

4. An apparatus for cutting flooring or the like to a desired line, comprising, a saw mounted on a carriage arranged to reciprocate on a pair of rails carried on a frame and arranged to be guided by one of said rails means for deflectively adjusting said rail in order to direct said saw through a predetermined course; in combination with a motor mounted on said carriage and organized to actuate said saw and propel said carriage through yieldable means carried on said carriage and auxiliary yielding means attached to said frame.

5. An apparatus for cutting flooring or the like to a desired line, comprising, a saw mounted on a carriage, means providing a deflectively adjustable rail on which the carriage is arranged to travel and guide said saw over a predetermined course, said carriage having vertical and horizontal contacts with said rail.

6. An apparatus for cutting flooring or the like to a desired line, comprising, a saw mounted on a carriage, said saw projecting above a table carried on beams, means providing a deflectively adjustable rail on which the carriage is arranged to travel and guide said saw over a predetermined course on said rail, which is adjustable by means of bolts attached to said rail and a beam.

ARTHUR B. BIRTLES.